United States Patent
Chen et al.

(10) Patent No.: US 9,176,713 B2
(45) Date of Patent: *Nov. 3, 2015

(54) METHOD, APPARATUS AND PROGRAM STORAGE DEVICE THAT PROVIDES A USER MODE DEVICE INTERFACE

(75) Inventors: Chiahong Chen, Oro Valley, AZ (US); Radha K. Ramachandran, Tucson, AZ (US); Cheng-Chung Song, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1086 days.

This patent is subject to a terminal disclaimer.

(21) Appl. No.: 11/289,985

(22) Filed: Nov. 30, 2005

(65) Prior Publication Data

US 2007/0124365 A1    May 31, 2007

(51) Int. Cl.
*G06F 15/16*    (2006.01)
*G06F 9/44*    (2006.01)

(52) U.S. Cl.
CPC ........................................ *G06F 8/36* (2013.01)

(58) Field of Classification Search
CPC .................................. G06F 8/36; G06F 9/468
USPC .................................................. 709/226, 229
See application file for complete search history.

(56) References Cited

U.S. PATENT DOCUMENTS

| | | | | |
|---|---|---|---|---|
| 5,003,466 A | * | 3/1991 | Schan et al. | 714/41 |
| 5,063,499 A | * | 11/1991 | Garber | 703/27 |
| 6,108,715 A | * | 8/2000 | Leach et al. | 719/330 |
| 6,272,519 B1 | * | 8/2001 | Shearer et al. | 718/104 |
| 6,732,179 B1 | * | 5/2004 | Brown et al. | 709/229 |
| 6,751,671 B1 | * | 6/2004 | Urien | 709/229 |
| 6,981,140 B1 | * | 12/2005 | Choo | 713/164 |
| 7,103,656 B2 | * | 9/2006 | Lewis et al. | 709/223 |
| 7,558,907 B2 | * | 7/2009 | Stern et al. | 711/103 |
| 7,784,058 B2 | * | 8/2010 | Rochette et al. | 719/310 |
| 2003/0009538 A1 | * | 1/2003 | Shah et al. | 709/219 |
| 2004/0225995 A1 | | 11/2004 | Marvin et al. | |
| 2005/0021606 A1 | * | 1/2005 | Davies et al. | 709/203 |
| 2005/0060706 A1 | * | 3/2005 | Doyon et al. | 718/100 |
| 2005/0081220 A1 | | 4/2005 | Yodaiken et al. | |

(Continued)

FOREIGN PATENT DOCUMENTS

WO    WO9517713    6/1995

OTHER PUBLICATIONS

Gilligan et al, RFC2553—Basic Socket Interface Extensions for IPv6, Mar. 1999, The Internet Society, 32 pages.*

*Primary Examiner* — Jonathan Bui
(74) *Attorney, Agent, or Firm* — Griffiths & Seaton PLLC (57) ABSTRACT

A method, apparatus and program storage device that provides a user mode device interface for enabling software reuse. The user mode device interface allows device interface requests to be sent and received, including commands and data structures, via socket communication. A device state machine on the client side is implemented in a set of shared functions that can be incorporated by all applications that want to communicate to a particular service provider. The service provider offers the software functions over a user mode device interface via socket communication. The device state machine on the service provider side is embedded in the socket server implementation. The interaction between the state machines on both client and server sides ensures a device interface request is properly handled.

11 Claims, 8 Drawing Sheets

(56) References Cited

U.S. PATENT DOCUMENTS

| | | | |
|---|---|---|---|
| 2005/0091358 A1* | 4/2005 | Mehra et al. | 709/223 |
| 2005/0097562 A1* | 5/2005 | Kelley et al. | 719/310 |
| 2005/0188370 A1* | 8/2005 | Kouznetsov et al. | 717/174 |
| 2005/0193366 A1* | 9/2005 | Boland et al. | 717/104 |
| 2005/0251864 A1* | 11/2005 | Kelley et al. | 726/26 |
| 2005/0261062 A1* | 11/2005 | Lewin et al. | 463/42 |
| 2006/0080517 A1* | 4/2006 | Brown | 711/163 |
| 2006/0101282 A1* | 5/2006 | Costea et al. | 713/188 |
| 2006/0107264 A1* | 5/2006 | Schmidt et al. | 718/100 |
| 2006/0212840 A1* | 9/2006 | Kumamoto et al. | 717/100 |
| 2007/0006150 A9* | 1/2007 | Walmsley | 717/120 |
| 2007/0294074 A1* | 12/2007 | Ciolfi | 703/21 |
| 2008/0126625 A1* | 5/2008 | Gilgen et al. | 710/56 |
| 2008/0155542 A1* | 6/2008 | Maigne et al. | 718/100 |
| 2008/0301719 A1* | 12/2008 | Roberts | 719/331 |

* cited by examiner

METHOD, APPARATUS AND PROGRAM STORAGE DEVICE THAT PROVIDES A USER MODE DEVICE INTERFACE

BACKGROUND OF THE INVENTION

1. Field of the Invention

This invention relates in general to a computer programming, and more particularly to a method, apparatus and program storage device that provides a user mode device interface for enabling software reuse.

2. Description of Related Art

In a highly competitive market environment, "time to market with superior quality" is the key focus in developing a new product. For a well-established development team with years of experience in software development, the reusability of existing software is the very key to achieving the goals of delivering a new product in the most efficient way with superior quality. Given the same competitiveness in the market environment, what a new product is required to do is constantly increasing and how much it is allowed to cost is reducing. For a software product development, the demanding requirements and pressure of lowering cost are translated into the need of reuse existing software functions in various hardware platforms. One of the focus items to achieve high software reusability is to develop the software functions with the encapsulation of a platform they are operating upon. The platform includes the actual hardware and the operating systems.

One key consideration in selecting a platform for a product is whether the software can best perform in privileged mode or user mode. User mode refers to a nonprivileged state where the executing code is forbidden by the kernel from performing potentially dangerous operations such as writing to system configuration files, killing other users' processes, rebooting the system, etc. In contrast, kernel mode or privileged mode is the mode in which the operating system kernel runs. Code running in this mode has unlimited access to the system memory and external devices.

The traditional thinking is software can best perform in privileged mode. However, given the advancing technology in hardware platform development, operating in user mode may be a much better choice given different product requirements. The built-in protection provided by all modern operating systems for a software running in user mode, the ease of managing a program in a user mode, and the improved system stability with new software functions isolated from kernel are significant benefits of implementing a software project in user mode.

In the past, a developer of a user mode application that desired access to functions running in privilege mode needed to create a private kernel mode driver. Unfortunately, this solution has the disadvantage of requiring all the developers of user mode applications to develop unique kernel mode drivers to essentially provide private access to the privilege functions. More recently, a device interface has been used to map calls to the interface to the kernel mode implementation if the given process is a kernel mode process and to a user mode implementation if the given process is a user mode process.

However, to achieve the reusability and re-implement software functions that were previously running in privileged mode, there needs to be a consistent interface to invoke these functions in both privileged and user modes. For software functions that are to be implemented for running in privileged mode, the device interface is a common interface for all user mode applications to access software functions implemented in privileged mode. However, the device interface is not available to invoke the same software functions if they are ported to be running in user mode.

It can be seen then that there is a need for a method, apparatus and program storage device that provides a user mode device interface for allowing functions previously to be running in privileged mode to be re-implemented to run in user mode.

SUMMARY OF THE INVENTION

To overcome the limitations in the prior art described above, and to overcome other limitations that will become apparent upon reading and understanding the present specification, the present invention discloses a method, apparatus and program storage device that provides a user mode device interface for enabling software reuse.

The present invention solves the above-described problems by providing a user mode device interface allows device interface requests to be sent and received, including commands and data structures, via socket communication. A device state machine on the client side is implemented in a set of shared functions that can be incorporated by all applications that want to communicate to a particular service provider. The service provider offers the software functions over a user mode device interface via socket communication. The device state machine on the service provider side is embedded in the socket server implementation. The interaction between the state machines on both client and server sides ensures a device interface request is properly handled.

A user mode device interface in accordance with an embodiment of the present invention includes a user side object for generating requests for use of software functions running on an application running in privilege mode and a server side object for performing the request and forwarding a response based on the request to the user side object.

In another embodiment of the present invention, a computing system is provided. The computer system includes a processor having a user mode and a protected kernel mode and a memory, coupled to the processor, the memory including program code, executing in the processor, for providing a user mode device interface, the user mode device interface processing a request for use of software functions running on an application running in privilege mode.

In another embodiment of the present invention, a program storage device is provided. The program storage device embodies program instructions executable by a processing device to perform operations for providing a user mode device interface for enabling software reuse, wherein the operations include issuing from a user side a request to open a device with a proper device identifier on a server side and processing the request on the server side including performing a function identified by the request.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device that provides a user mode device interface for enabling software reuse. The user mode device interface allows device interface requests to be sent and received, including commands and data structures, via socket communication. A device state machine on the client side is implemented in a set of shared functions that can be incorporated by all applications that want to communicate to a particular service provider. The service provider offers the software functions over a user mode device interface via socket communication. The device state machine on the service provider side is embedded in the socket server implementation. The interaction between the state machines on both client and server sides ensures a device interface request is properly handled.

Figure 1:
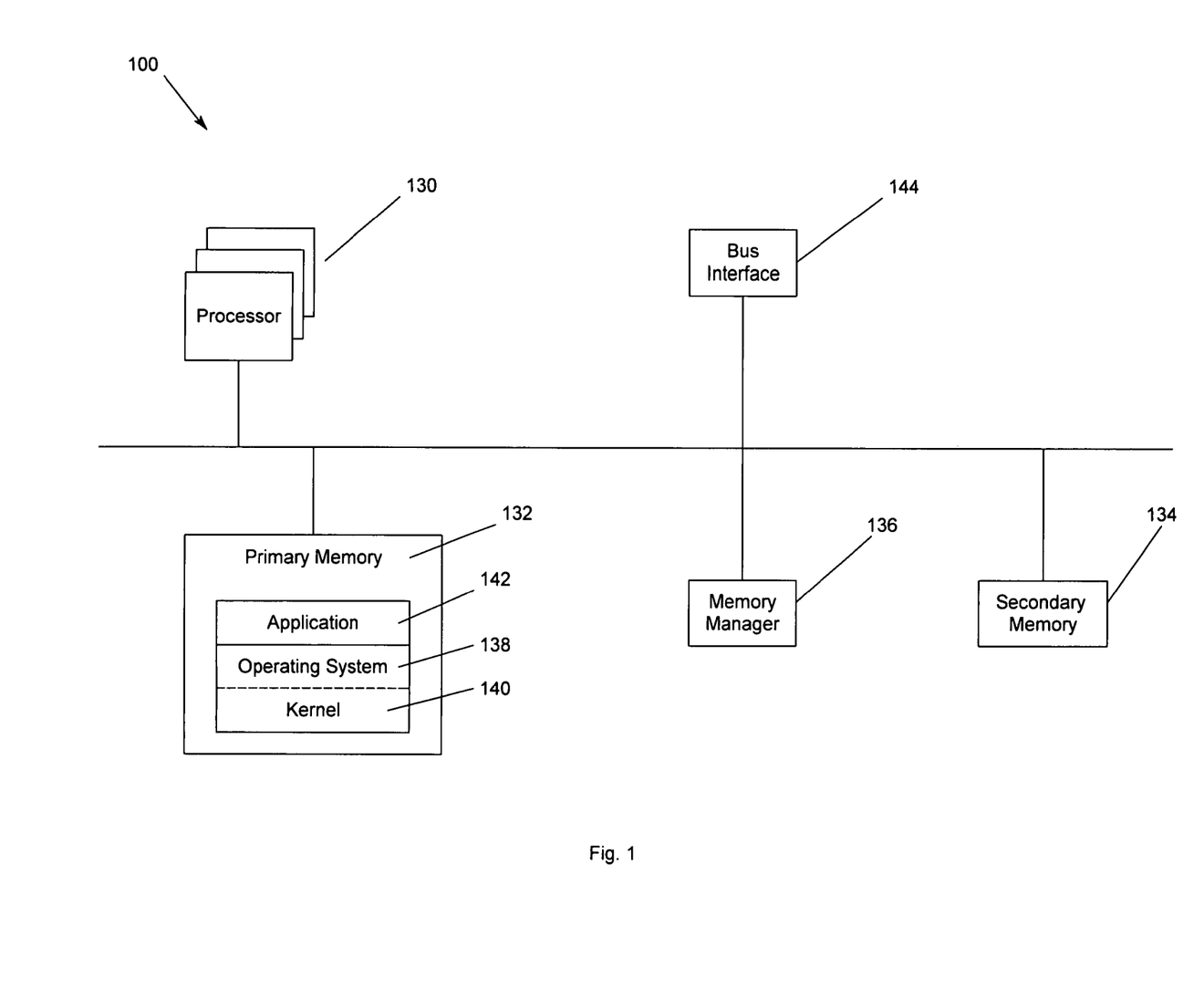
FIG. 1 illustrates a block diagram of a computer system according to an embodiment of the present invention.

FIG. 1 illustrates a block diagram of a computer system 100 according to an embodiment of the present invention. In FIG. 1, the computer system 100 includes one or more processors 130, which are each capable of executing a thread within one of a number of concurrent multithreaded processes. As is typical in multitasking data processing systems, each user process may be allocated its own virtual memory space, which may be mapped partially into a high-speed primary memory 132 and partially into a lower speed secondary memory 134 by memory manager 136.

The computer system 100 and the allocation of system resources to the computer system 100 are controlled by operating system 138. For the purpose of the present discussion, it is assumed that operating system 138 is resident within primary memory 132, although those skilled in the art will appreciate that certain infrequently utilized segments of operating system 138 may be swapped out to secondary memory 134 by memory manager 136. Operating system 138 includes kernel 140, which comprises the lowest layer of operating system 138 that interacts most directly with the computer system 100. Kernel 140 dispatches kernel threads to processors 130 for execution, provides services to device drivers interfacing with hardware within computer system 100, and implements system services, memory management, network access, and the file system utilized by computer system 100. In addition to kernel 140, primary memory 132 also stores frequently utilized segments of application software 142. As is well-known to those skilled in the art, application software 142 communicates with operating system 138 through an Application Programming Interface (API).

Computer system 100 also includes bus interface 144 through which multiple nodes can interface to system resources available within computer system 100. As will be appreciated by those skilled in the art, computer system 100 may also include additional hardware coupled to system bus 146 that is not necessary for an understanding of the present invention and is accordingly omitted for simplicity.

Figure 2:
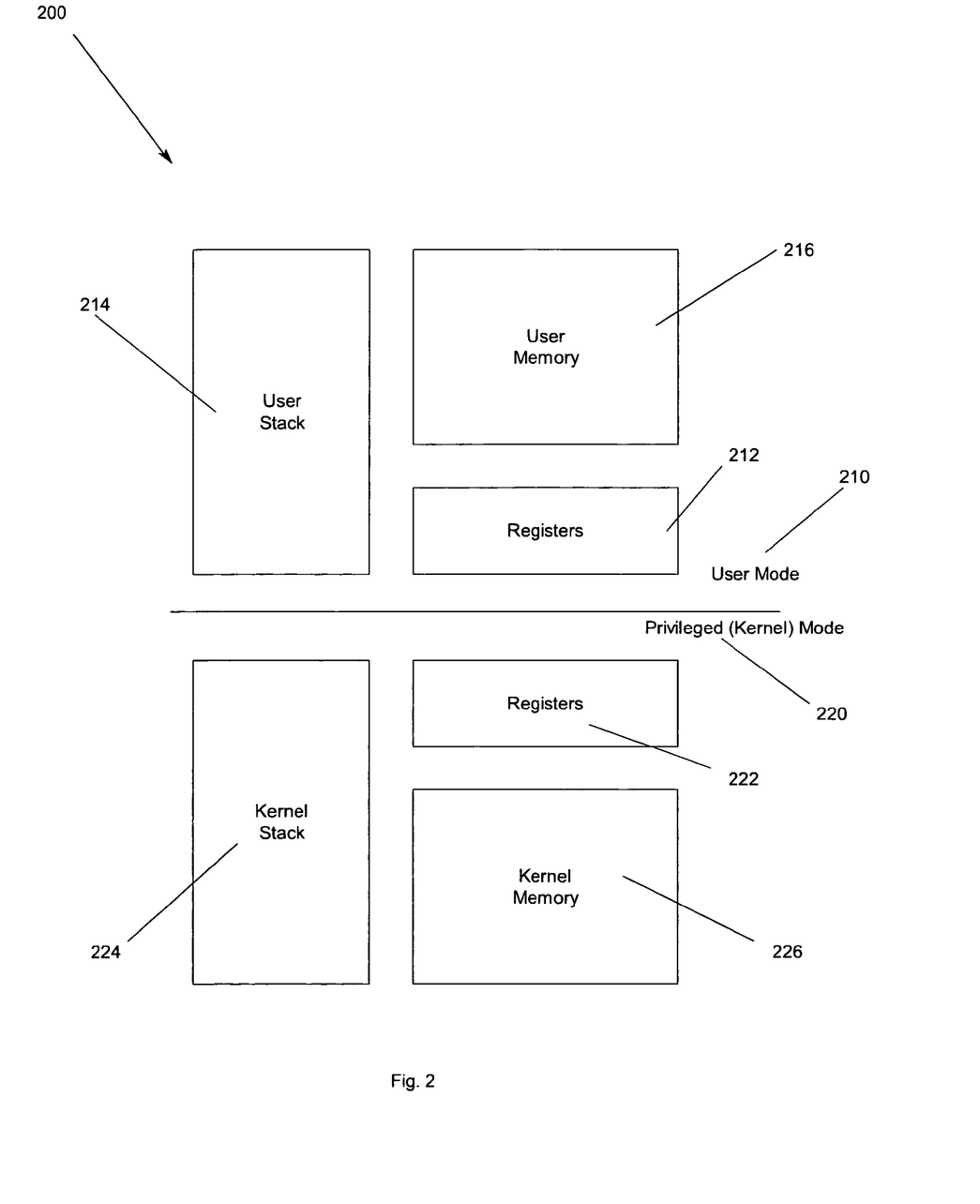
FIG. 2 shows he user mode and kernel mode states according to an embodiment of the present invention.

FIG. 2 shows he user mode and kernel mode states 200 according to an embodiment of the present invention. In FIG. 2, a user mode 210 and kernel mode 220 are shown. Applications and subsystems run on the computer in user mode 210. Processes that run in user mode 210 do so within their own virtual address spaces. They are restricted from gaining direct access to many parts of the system, including system hardware, memory not allocated for user mode 210, and other portions of the system that might compromise system integrity.

Processes that run in kernel-mode 220 can directly access system data and hardware, and are not restricted like processing running in user-mode 210. Performance-sensitive drivers and services run in kernel mode 220 to interact with hardware more efficiently. All components for processes running in kernel-mode 220 are fully protected from applications running in user mode 210. Processes that run in user mode 210 are effectively isolated from processes running in kernel-mode 220 and other processes running in user-mode 210.

In FIG. 2, a thread for a process running in user mode 210 is characterized as having its own context including registers 212 and memory stack 214. A user stack 214 is a data structure that includes a series of memory locations and a pointer to the initial location. All processors provide instructions for placing and retrieving values to and from the stack 214. The user memory 216 is a block of memory that is dedicated to the use of a current process running in user mode 210. A complete user state of a thread is maintained in user registers 212.

The kernel operates in its own protected address space and includes its own registers 222 and kernel stack 224. The kernel maintains the integrity of its own data structures and that of other processes. The kernel stack 224 includes information used by the kernel. Kernel memory 226 is generally shared by all processes, but is only accessible in kernel mode 220. Context switches from one task to another happen on the kernel stack 214 of the current process.

Figure 3:
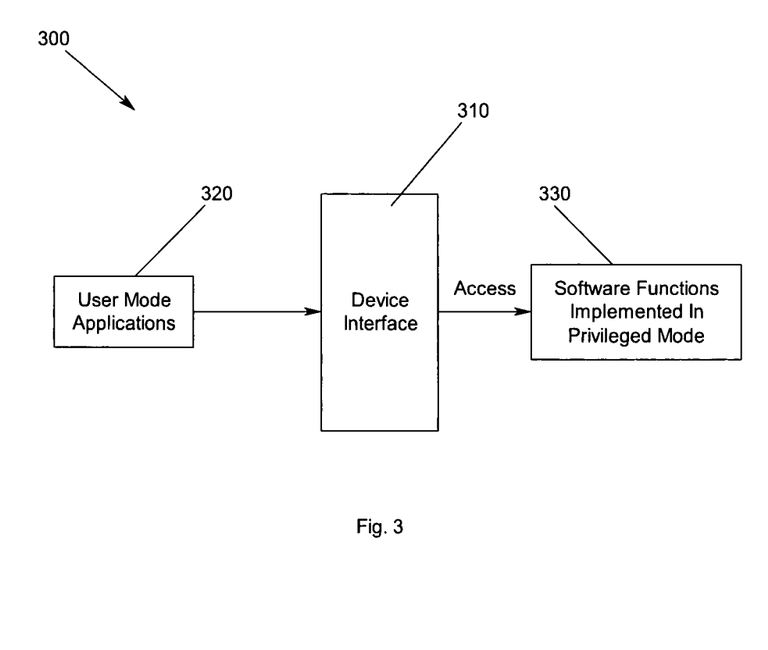
FIG. 3 illustrates an architecture of a computer system.

FIG. 3 illustrates an architecture of a computer system 300. In FIG. 3, a device interface 310 is shown disposed between user mode applications 320 and software functions running in privileged mode 330 (e.g., kernel mode). The device interface 310 provides an interface for all applications running in user mode 320 to access software functions implemented in privileged mode 330. However, the device interface 310 is not available to invoke these same software functions if they are ported to be running in user mode.

Figure 4:
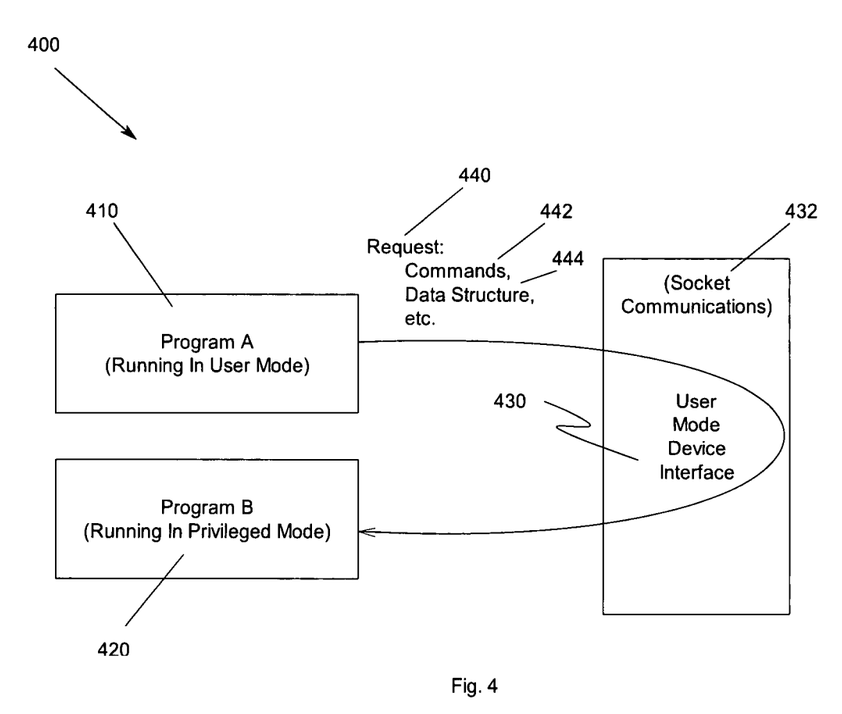
FIG. 4 is a diagram showing operation of user mode device interface according to an embodiment of the present invention.

FIG. 4 is a diagram showing operation of user mode device interface 400 according to an embodiment of the present invention. In FIG. 4, a first application is running in a user mode 410. The first application 410 wants to use software functions of a second application 420. The second application 420 is running in privileged mode. The user mode device interface 430 allows device interface requests 440 to be sent and received, including commands 442 and data structures 444, via socket communication 432.

The user mode device interface 430 enables software functions 420 that were previously running in privileged mode to be reused and re-implemented. The user mode device interface 430 provides a consistent interface to invoke these functions 420 in both privileged and user modes. The user mode device interface 430 preserves the core of the software functions 420 without any change regardless of whether they are running in privileged or user mode. The user mode device interface 430 also preserves the expectation by these software functions 420 to receive requests from a user mode device interface 430. The user mode device interface 430 achieves high software reusability as well as quality because these software functions 420 have been tested and verified in previous development projects.

Figure 5:
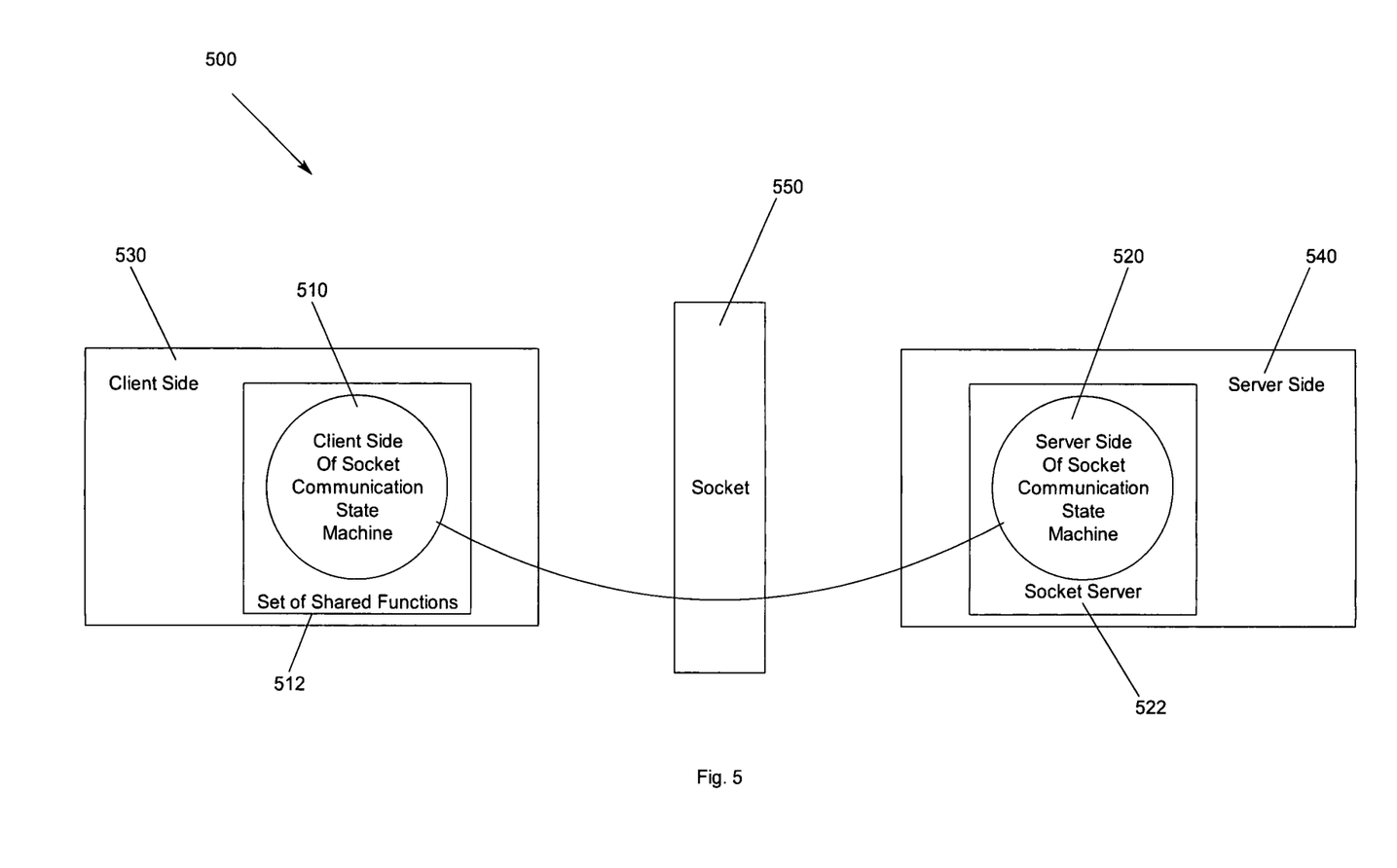
FIG. 5 illustrates device interface requirements of a device side and a server side according to an embodiment of the present invention.

FIG. 5 illustrates device interface requirements 500 of a device side and a server side according to an embodiment of the present invention. In FIG. 5, the user mode device interface includes device state machines 510, 520 that are implemented on both client 530 and server 540 sides of the socket 550 to satisfy device interface requirements. In FIG. 5, a device state machine on the client (requestor making requests) side 510 is implemented in a set of shared functions 512 that can be incorporated by all applications that want to communicate to a particular user program on the service provider side 540. The service provider 540 offers the software functions over a user mode device interface via socket communication 550. The device state machine on the server (service provider) side 520 is embedded in the socket server implementation 522. The interaction between the state machines 510, 520 on both client 530 and server 540 sides ensures a device interface request is properly handled.

Figure 6:
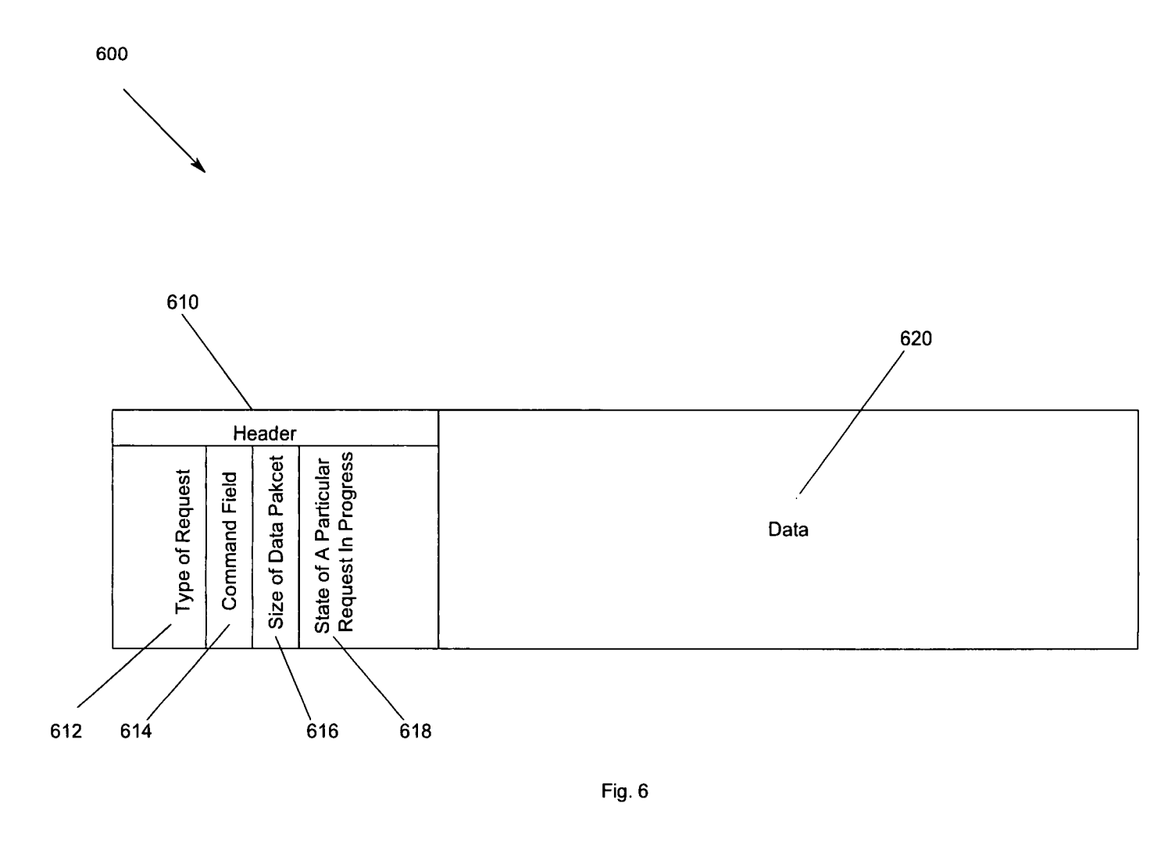
FIG. 6 illustrates a data packet structure for handling each request/response according to an embodiment of the present invention.

FIG. 6 illustrates a data packet structure 600 for handling each request/response according to an embodiment of the present invention. The data packets 600 are communicated over the socket interface in order to conduct a device interface request to a user program. All data packets 600 share a common header structure 610 and may include data 620. The header structure 610 specifies a type of request 612, a command field 614, the size of a data packet 616, and the state of a particular request in progress 618.

Figure 7:
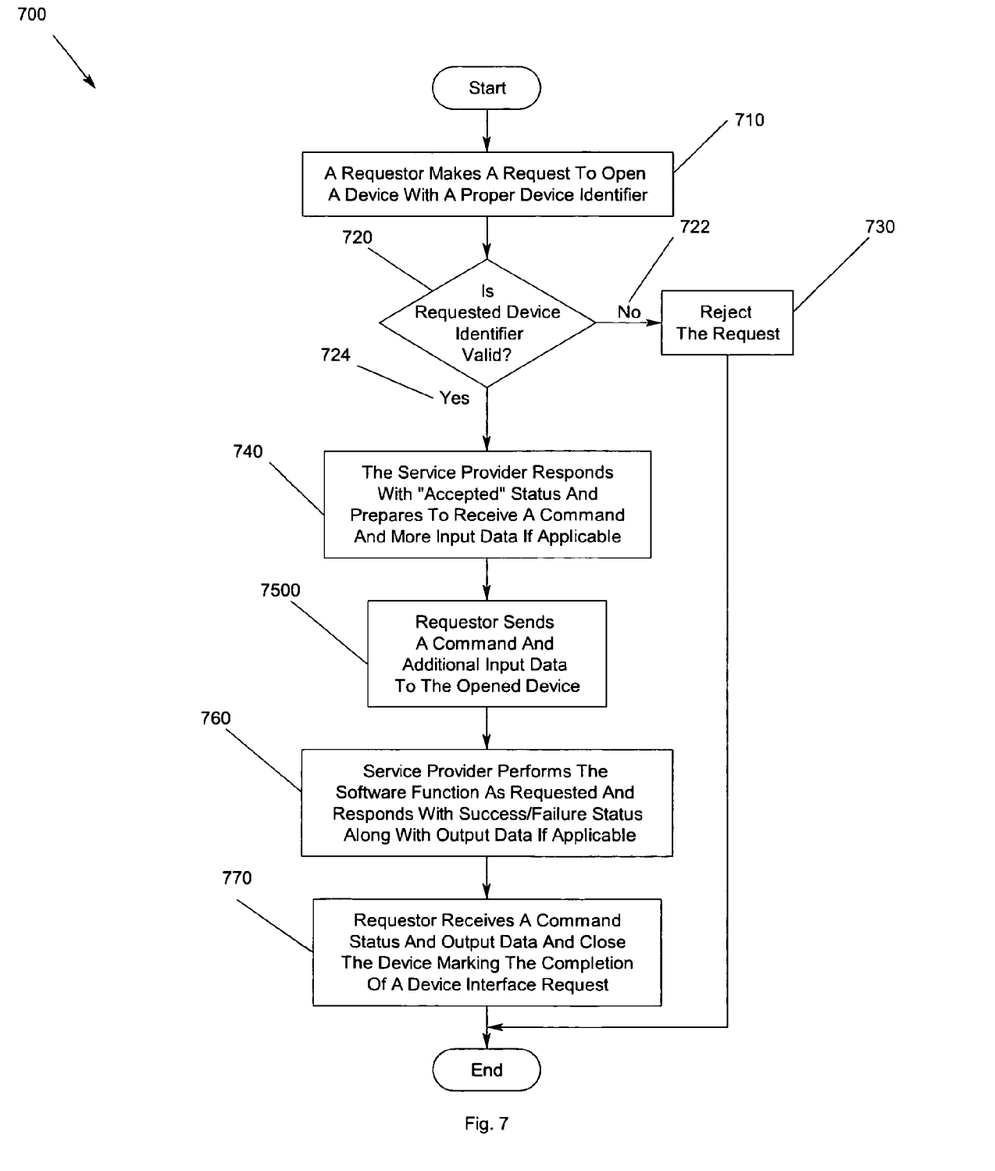
FIG. 7 is a flow diagram showing how a request for a software function is handled over a user mode device interface.

FIG. 7 is a flow diagram showing how a request for a software function is handled over a user mode device interface. In FIG. 7, a requestor first makes a request to open a device with a proper device identifier 710. The service provider checks to see if a requested device identifier is valid 720. If not 722, it rejects the request 730. If it is valid 724, the service provider responds with "accepted" status and prepares to receive a command and more input data if applicable 740. Once an "accepted" status is received, the requestor proceeds to send a command and additional input data to the opened device 750. The service provider performs the software function as requested and responds with success/failure status along with output data if applicable 760. Once a requester receives a command status and output data, it needs to close the device, which marks the completion of a device interface request 770.

Figure 8:
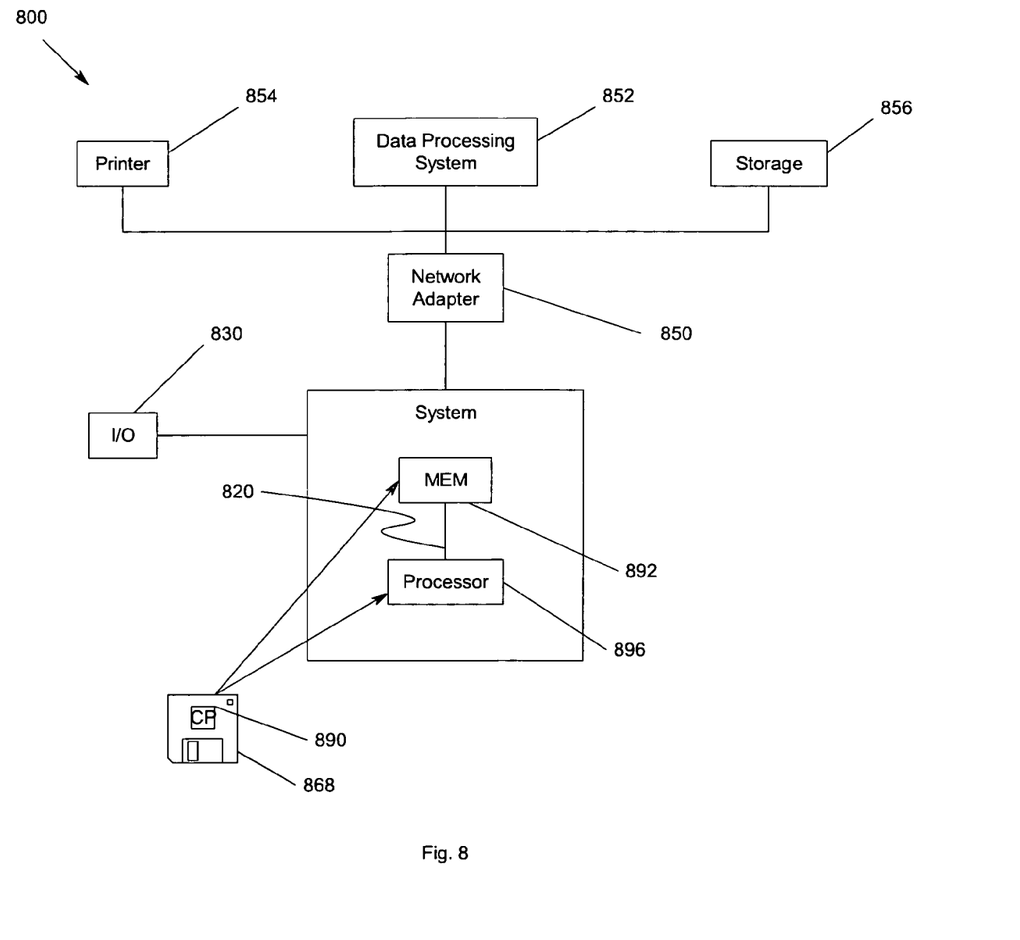
FIG. 8 illustrates a system according to an embodiment of the present invention.

FIG. 8 illustrates a system 800 according to an embodiment of the present invention. Embodiments of the present invention may take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 890 accessible from a computer-usable or computer-readable medium 868 providing program code for use by or in connection with a computer or any instruction execution system.

For the purposes of this description, a computer-usable or computer readable medium 868 can be any apparatus that can contain, store, communicate, propagate, or transport the program for use by or in connection with the instruction execution system, apparatus, or device. The medium 868 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A system suitable for storing and/or executing program code will include at least one processor 896 coupled directly or indirectly to memory elements 892 through a system bus 820. The memory elements 892 can include local memory employed during actual execution of the program code, bulk storage, and cache memories which provide temporary storage of at least some program code in order to reduce the number of times code must be retrieved from bulk storage during execution.

Input/output or I/O devices 840 (including but not limited to keyboards, displays, pointing devices, etc.) can be coupled to the system either directly to the system or through intervening I/O controllers.

Network adapters 850 may also be coupled to the system to enable the system to become coupled to other data processing systems 852, remote printers 854 or storage devices 856 through intervening private or public networks 860. Modems, cable modem and Ethernet cards are just a few of the currently available types of network adapters.

Accordingly, the computer program 890 comprise instructions which, when read and executed by the system 800 of FIG. 8, causes the system 800 to perform the steps necessary to execute the steps or elements of the present invention The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computing device, comprising:
   a processor configured to operate an operating system in a user mode and a privileged mode;
   a user memory coupled to the processor; and
   a kernel memory coupled to the processor, the kernel memory storing a user mode device interface configured for:
   storing software functions implemented in the privileged mode,
   enabling applications running in the user mode to access the software functions implemented in the privileged mode,
   receiving requests, from a user side object configured for operating in the user mode, to use the software functions implemented in the privileged mode, and performing, by a server side object configured for operating in the user mode, the request and forwarding a response to the user side object based on the request, wherein:
the software functions implemented in the privileged mode are only stored in the kernel memory and are unavailable outside the kernel memory,
the user memory is dedicated for storing the applications operating in the user mode,
the software functions were previously available to the processor in the privileged mode,
the software functions transition to be currently available to the processor in the user mode in response to the requests, such that the software functions are no longer available to the processor in the privileged mode, and
the user mode device interface maintains the software functions without any changes when the software functions transition from being available to the processor in the privileged mode to being available to the processor in the user mode.

2. The computing device of claim 1, wherein the user mode device interface further comprises a socket interface for coupling the server side object and the user side object and for providing socket communication between the server side object and the user side object.

3. The computing device of claim 1, wherein the user side object includes a user side device state machine, the user side device state machine comprises a set of shared functions capable of being incorporated by applications desiring to communicate with the software functions running in the user mode.

4. The computing device of claim 1, wherein the server side object includes a server side device state machine embedded in a socket server implementation to provide interaction between the server side device state machine and the user side device state machine.

5. The computing device of claim 1, wherein the user side object and the server side object are configured to enable software functions running in the privileged mode to be reused in the user mode via the user mode device interface.

6. The computing device of claim 1, wherein the user mode device interface is configured to provide a consistent interface to invoke functions in the user mode.

7. The computing device of claim 1, wherein the user mode device interface is configured to preserve the core of the software functions when the software functions run in the user mode.

8. The computing device of claim 1, wherein the user side object and server side object are configured to preserve the expectation by the software functions to receive requests from the user mode device interface.

9. A computing system, comprising:
a processor including an operating system configured to operate in a user mode and a privileged mode;
a user memory coupled to the processor; and
a kernel memory coupled to the processor, the kernel memory including program code, executing by the processor, for providing a user mode device interface, the user mode device interface configured for:
storing software functions implemented in the privileged mode,
enabling applications running in the user mode to access the software functions implemented in the privileged mode, and
processing requests from a first application running on the processor in the user mode to use a software function of the software functions implemented in the privileged mode running on a second application running on the processor in the privileged mode, wherein:
the software functions implemented in the privileged mode are only stored in the kernel memory and are unavailable outside the kernel memory,
the user memory is dedicated for storing applications operating in the user mode,
the software functions were previously available to the processor in the privileged mode,
the software functions transition to be currently available to the processor in the user mode in response to the requests, such that the software functions are no longer available to the processor in the privileged mode, and
the user mode device interface maintains the software functions without any changes when the software functions transition from being available to the processor in the privileged mode to being available to the processor in the user mode.

10. A non-transitory computer-readable storage medium, comprising:
program instructions executed by a processing device to perform operations for storing software functions implemented in a user mode;
program instructions executed by the processing device to perform operations for enabling applications running in the user mode to access the software functions implemented in the user mode;
program instructions executed by the processing device to perform operations for storing software functions implemented in a privileged mode;
program instructions executed by the processing device to perform operations for enabling the applications running in the user mode to access the software functions implemented in the privileged mode;
program instructions executed by the processing device to perform operations for providing a user mode device interface for enabling software reuse, the operations comprising:
receiving requests, from a user side object configured to operate in the user mode, to use the software functions implemented in the privileged mode,
performing, by a server side object configured to operate in the user mode, the request, and
forwarding a response to the user side object based on the request, wherein:
the software functions implemented in the privileged mode are only stored in a kernel memory,
the software functions implemented in the privileged mode are unavailable outside the kernel memory,
the software functions were previously available to the processor in the privileged mode,
the software functions transition to be currently available to the processor in the user mode in response to the requests, such that the software functions are no longer available to the processor in the privileged mode, and
the user mode device interface maintains the software functions without any changes when the software functions transition from being available to the processor in the privileged mode to being available to the processor in the user mode.

11. The non-transitory computer-readable storage medium of claim 10, wherein performing the request on the server side further comprises responding with an indication of whether the performing the function was a success.

* * * * *